US007784104B2

(12) United States Patent
Innami et al.

(10) Patent No.: US 7,784,104 B2
(45) Date of Patent: Aug. 24, 2010

(54) POWER TOOL SYSTEM

(75) Inventors: Teruhisa Innami, Hikone (JP); Masaki Ikeda, Hikone (JP); Naotake Tanaka, Hikone (JP); Atsumasa Kubota, Hikone (JP); Tatsuya Miwa, Maibara (JP)

(73) Assignee: Panasonic Electric Works Co., Ltd., Kadoma-shi, Osaka (JP)

( * ) Notice: Subject to any disclaimer, the term of this patent is extended or adjusted under 35 U.S.C. 154(b) by 1161 days.

(21) Appl. No.: 11/349,887

(22) Filed: Feb. 9, 2006

(65) Prior Publication Data

US 2006/0179473 A1 Aug. 10, 2006

(30) Foreign Application Priority Data

Feb. 10, 2005 (JP) ............................ 2005-034729

(51) Int. Cl.
*G06F 21/00* (2006.01)
*G06F 1/26* (2006.01)

(52) U.S. Cl. .................... 726/34; 726/2; 726/4; 726/36

(58) Field of Classification Search ..................... 726/2, 726/4, 34–36

See application file for complete search history.

(56) References Cited

U.S. PATENT DOCUMENTS 5,769,032 A * 6/1998 Yarnall et al. ............... 119/721
5,796,827 A * 8/1998 Coppersmith et al. ....... 713/182
5,876,425 A * 3/1999 Gord et al. .................... 607/56
6,005,489 A 12/1999 Siegle et al.
6,108,197 A * 8/2000 Janik ..................... 361/679.03
6,246,770 B1 * 6/2001 Stratton et al. .............. 380/281
6,607,041 B2 * 8/2003 Suzuki et al. .................. 173/4
7,363,504 B2 * 4/2008 Bonalle et al. .............. 713/186
2003/0174049 A1 * 9/2003 Beigel et al. ............. 340/10.42
2004/0108120 A1 6/2004 Wiesner et al.

(Continued)

FOREIGN PATENT DOCUMENTS

DE 4429206 A1 3/1996

(Continued)

OTHER PUBLICATIONS

Japanese Examination Report dated Jul. 7, 2009, issued in JP2005-034729.

(Continued)

*Primary Examiner*—Taghi T Arani
*Assistant Examiner*—Justin T Darrow
(74) *Attorney, Agent, or Firm*—Edwards Angell Palmer & Dodge LLP

(57) ABSTRACT

A power tool system with enhanced antitheft capability has a hand-held power tool and a wearable piece worn by the user. The wearable piece incorporates a certification unit which stores an identification code specifying the power tool and transmits the identification code to an authenticator incorporated in the power tool. The authenticator reads the identification code from the certification unit and to provide an authentication signal when the identification code is authenticated to be eligible for a privileged use of the power tool. The power tool is enabled only in response to the authentication signal, and otherwise disabled for avoiding unauthorized use. A communication is established between the certification unit and the authenticator for transmission of the identification code, while the user holds the power tool with the wearable piece carried on.

11 Claims, 4 Drawing Sheets

U.S. PATENT DOCUMENTS

| | | | | |
|---|---|---|---|---|
| 2006/0179473 | A1 * | 8/2006 | Innami et al. | 726/2 |

FOREIGN PATENT DOCUMENTS

| | | | |
|---|---|---|---|
| DE | 10029138 | A1 | 1/2002 |
| DE | 10238710 | A1 | 3/2004 |
| EP | 1690648 | A2 * | 8/2006 |
| JP | 11-129164 | | 5/1999 |
| JP | 2001-043322 | | 2/2001 |
| JP | 2002-18744 | | 1/2002 |
| JP | 2002-536726 | | 10/2002 |
| JP | 2004-173471 | | 6/2004 |
| JP | 2004-181549 | | 7/2004 |
| WO | WO-00/45324 | | 8/2000 |

OTHER PUBLICATIONS

European Search Report dated Nov. 5, 2009 issued in European Patent Application No. 06002301.

* cited by examiner

POWER TOOL SYSTEM

TECHNICAL FIELD

The present invention is directed to a power tool system, and more particular to an antitheft power tool system which permits the use of a power tool only by an authenticated user.

BACKGROUND ART

Japanese Patent Publication No. 2002-18744 A discloses a power tool management system which is designed to generate maintenance information prompting a user to make a suitable maintenance when a cumulative use of the power tool satisfies a predetermined criterion. The system includes a management unit which is provided as a separate entity from the power tool and is configured to give the criterion to the power tool by means of a radio transmission. The management unit is also configured to set one of predetermined operation modes, one being a normal mode which permits the power tool to operate upon actuation of a power switch, and the other being a disable mode which inhibits the power tool from operating even upon actuation of the power switch. In this sense, the above system can be more or less security-oriented to prevent an unauthorized use of the power tool. However, it is required a rather cumbersome routine to set the power tool in security. That is, each time the power tool is stored, the management unit has to be manipulated to set the disable mode. In addition, it is also required to release the disable mode and set the normal mode each time the authorized user intends to use the power tool. Since there has been reported an increased number of cases of the power tools being stolen, there is a certain demand of realizing an antitheft power tool system without resorting to the cumbersome management as proposed in the above prior art system.

DISCLOSURE OF THE INVENTION

In view of the above problem, the present invention has been achieved to provide an antitheft power tool system which is capable of placing the power tool in security without resorting to any awkward setting. The power tool system in accordance with the present invention includes the power tool configured to include a controller which enables the power tool only upon receiving an authentication signal, and a wearable piece which is provided as a separate entity from the power tool and is configured to be worn by the user. The system includes a certification unit and an authenticator, one of which is incorporated in the wearable piece, and the other of which is incorporated in the power tool. The certification unit is configured to store an identification code specifying the power tool and to transmit the identification code. The authenticator is configured to read the identification code from the certification unit and to provide the authentication signal to the controller when the identification code is authenticated to be eligible for a privileged use of the power tool. Communication means is included in the system to establish a communication between the certification unit and the authenticator for transmission of the identification code, while the user holds the power tool with the wearable piece carried on. Accordingly, the power tool can be authenticated simply by the existence of the wearable piece on the user. Thus, the system can be free from any additional authentication procedure for preventing the unauthorized use of the power tool, giving an enhanced antitheft effectiveness to the power tool.

Preferably, the communication means is configured to use the user's body as a signal transmission path so that the communication can be established automatically in response to the user holds the power tool. In this instance, the communication means comprises a first transceiver incorporated in the certification unit and a second transceiver in the authenticator. The first transceiver includes a signal electrode and a ground electrode which are configured to be held in close proximity to the user's body in a spatially spaced from each other. Also included in the first transceiver is a first transmitter which is configured to apply a voltage signal indicative of the identification code across the signal electrode and the ground electrode. The second transceiver includes a circuit ground for connection with the ground through a casing of the power tool, a touch electrode provided on a grip of the power tool for contact with the user's hand, and a signal detector which is connected across the touch electrode and the circuit ground for detection of the voltage signal.

Alternatively, the communication means may be configured to make a radio signal transmission between the certification unit and the authenticator. In this instance, the first transceiver is configured to include a first antenna, and a first transmitter configured to transmit a voltage signal indicative of the identification code through the first antenna. The second transceiver is configured to include a second antenna for receiving the voltage signal transmitted through the first antenna, and a reader which converts the voltage signal into a data to be authenticated.

The authenticator, which is incorporated in the power tool or in the wearable piece, interrogates the certification unit to receive the identification code therefrom for authentication thereof, and transmits the authentication signal to the controller when the identification code is authenticated.

Preferably, the authenticator is configured to become active in response to the energization or triggering of the power tool so that the authenticator can determines whether or not the user is authorized at the start of operating the power tool. In this consequence, the communication between the certification unit and the authenticator can be made inactive after the authentication is completed, thereby keeping a power requirement at a minimum. When the power tool is of the type having a direction selector which is movable past a neutral position between a forward position of rotating the motor in a forward direction and a reverse position of rotating the motor in a reverse direction, the authenticator may be configured to be activated in response to the direction selector being out of the neutral position of not rotating the motor.

When the power tool is configured to have a function of varying an output power or an output torque to be applied a target object, the certification unit in the wearable piece is preferred to store a limit value of the output power or the output torque. The transmitter is configured to pass the limit value from the certification unit to the controller for limiting said output power or said output torque. Thus, the user is easy to operate the power tool suitably for applying the output power or torque to the target object simply by carrying the wearable piece and without a bothering on-spot adjustment.

Further, the certification unit may be configured to communicate with a transmitter provided on the side of the target object, in order to obtain the limit value specified in a data memory provided on the side of said target object. Thus, the user can be easy to operate the power tool suitably in compliance with the requirement of the target object.

For the power tool equipped with a detachable battery pack, it is preferred that the battery pack includes a battery authenticator and an interrupter. The battery authenticator is configured to read the identification code from the certification unit and to provide a battery authentication signal when the identification code is authenticated to be eligible for a privileged use of the battery pack. The interrupter is configured to interrupt an electrical connection from the battery pack to the power tool in the absence of the battery authentication signal. Thus, only the authorized user can use the battery pack, which adds an antitheft value to the battery pack.

These and still other advantageous features of the present invention will become more apparent from the following description of the preferred embodiment when taken in conjunction with the attached drawings.

BEST MODE FOR CARRYING OUT THE INVENTION

Figure 1:
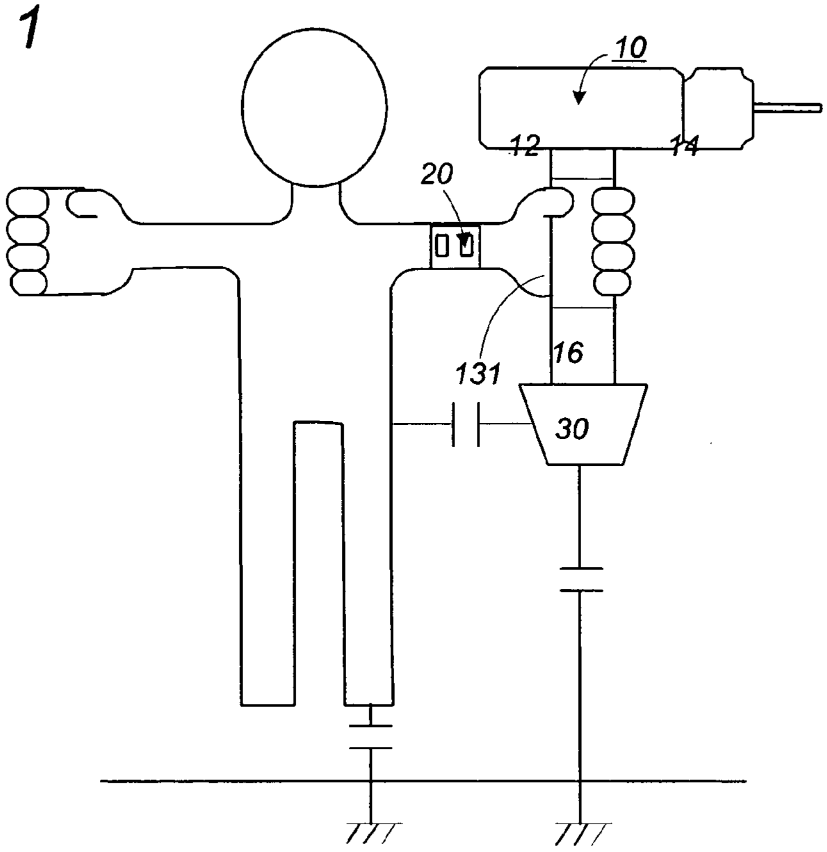
FIG. 1 is a schematic view of a power tool system in accordance with a preferred embodiment of the preset invention.
Figure 3:
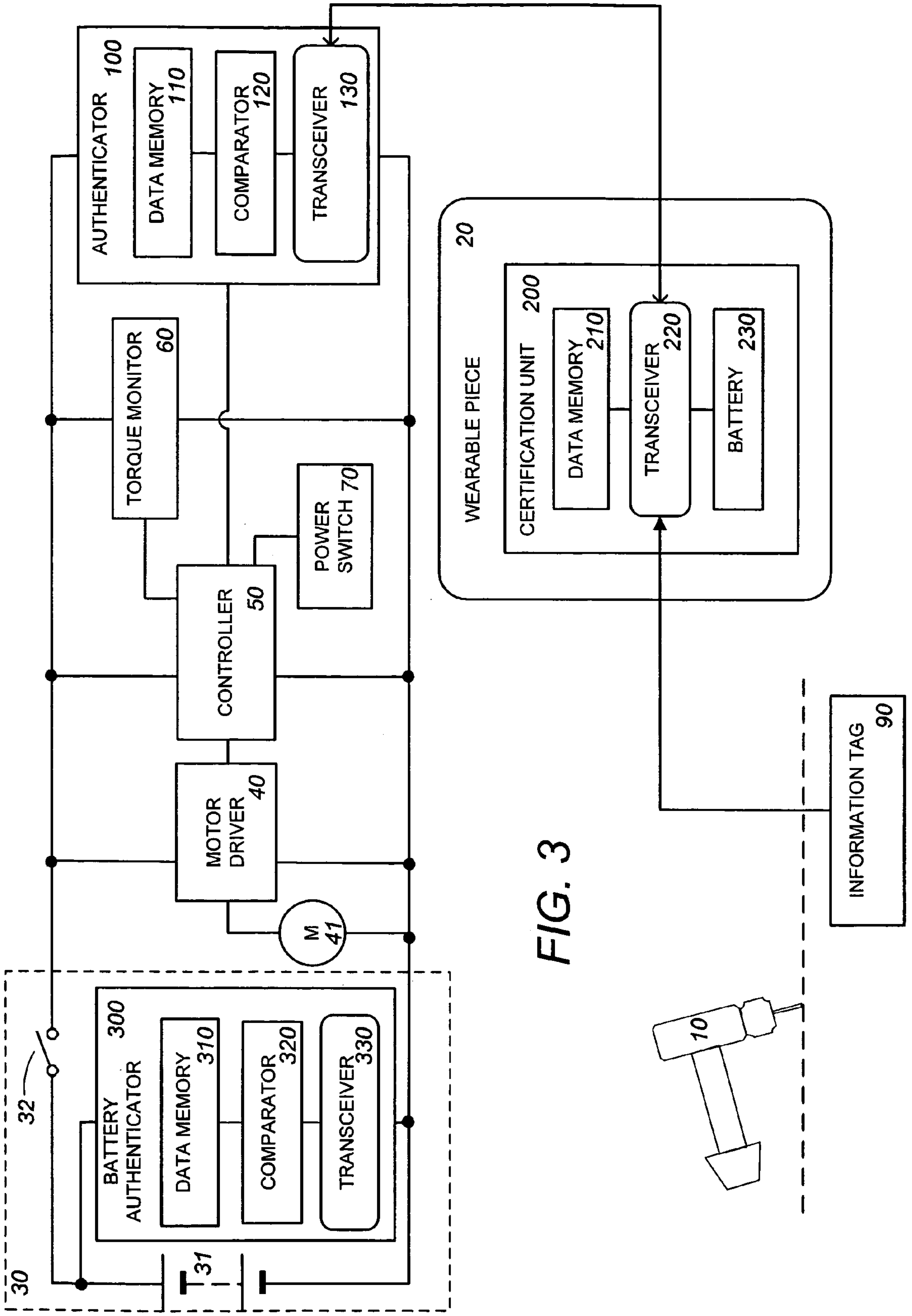
FIG. 3 is a block diagram illustrating a structure of the above system.

Referring now to FIGS. 1 and 3, there is shown a power tool system in accordance with a preferred embodiment of the present invention. The system includes a power tool 10 and a wearable piece 20 configured to be worn on a user. The power tool is a hand-held tool, for example, such as a battery operated power screwdriver, drill, or wrench, and has a casing 12 accommodating a motor, a battery pack 30 detachable to the casing, a chuck 14 holding a tool bit, and a grip 16 shaped to be grasped by the user's hand. The wearable piece 20 is prepared in the form of a wrist watch, a band or a card adapted to fit on a wrist or any other part of the user's body or to be carried in a clothing pocket for communication with the power tool 10.

As shown in FIG. 3, the power tool 10 has a circuit configuration composed of a motor driver 40 for a reversible motor 41, a controller 50 controlling the motor driver 40 for varying the speed or torque of the motor, a torque monitor 60 for obtaining a torque acting on the tool bit, and a power switch 70. Also incorporated in the circuit of the power tool 10 is an authenticator 100 which is composed of a data memory 110 storing an identification code of the power tool, a comparator 120, and a transceiver 130 for communication with a certification unit 200 incorporated in the wearable piece 20. The battery pack 30 includes, in addition to rechargeable cells 31, a battery authenticator 300 and an interrupter 32 which interrupts an electrical connection with the motor 41. The battery authenticator 300 is of the same structure as the authenticator 100 and includes a data memory 310 storing an identification code of the battery pack, a comparator 320, and a transceiver 330. The identification code of the battery pack may be equal to or different from that of the power tool 10.

The certification unit 200 is configured to have a data memory 210 storing one or more of the identification codes, a transceiver 220 for communication with the authenticator 100, and a battery 230 supplying a power to the transceiver 220. The identification code can be written into the data memory 210 by use of a management tool (not shown) such as realized by a personal computer.

In the present embodiment, the communication is established by a signal transmission path which extends from the power tool 10 to the wearable piece 20 through a part of the user's body as shown in FIG. 1, details of which will be discussed later. Upon the power switch 70 being triggered by the user holding the power tool 10 with the wearable piece 20 carried on, the authenticator 100 is activated to interrogate the certification unit 200, requesting to send the identification code or codes back to the authenticator 10, and verifies at the comparator 120 whether or not the identification code from the wearable piece 20 is in match with the identification code in the data memory 110. When the identification codes are matched, the comparator 120 gives an authentication signal as indicative of that the user carrying the wearable piece 20 is authenticated to be eligible for a privileged use of the power tool. The authentication signal is sent to the controller 50 which responds to give an enable signal to the motor driver 40, enabling the motor 41 and therefore permitting the use of the power tool. In the absence of the authentication signal, the controller 50 gives an disable signal to the controller 50, prohibiting the motor driver 40 from driving the motor.

In addition, the certification unit 200 is configured to store a limit value of the output power and/or torque which may vary depending upon the type and kind of the work intended for a target object. The limit value is stored in the data memory 210 together with the identification code and is transmitted to the authenticator 100 where it is distributed to the controller 50 which controls the motor drive 40 for limiting the output power and/or torque to the limited value. The limit value is written into the data memory 210 by the management tool and is shown in a display 240 for confirmation by the user.

The battery authenticator 300 is configured to have the same function as the authenticator 100, and compares the identification code transmitted from the certification unit 200 with the identification code in the data memory 310 so as to gives a battery authentication signal when the identification codes are matched. The battery authentication signal is fed to the interrupter 32 in the form of a switch to keep it closed for supplying the electric power to the motor 41. In the absence of the battery authentication signal, the interrupter 32 is caused to open, thereby interrupting the electrical connection between the battery pack 30 and the motor 41, disabling the battery pack 30 and therefore preventing unauthorized use of the battery pack.

It is preferable that an associated battery charger is also given a function of enabling the charging only in response to the authentication signal. In order to make the use of the authentication signal, the battery charger is configured to read the authentication signal from the battery pack when connected thereto.

Further, the transceiver 230 of the certification unit 200 is given a function of communicating with an information tag 90 attached to the target object to read the limit value written in the information tag 90, transmitting the limit value and writing it in the data memory 210 such that the authenticator 100 retrieves the limit value from the information tag 90 and passes it to the controller 50, for limiting the output power and/or torque of the power tool. Thus, the power tool can be utilized optimally without forcing the user to adjust the output power and/or torque. The information tag 90 is configured to include a data memory storing the limit value, a touch electrode, and a transmitter of a like configuration as utilized in the transceiver 130 of the authenticator. Upon the touch electrode being touched by the user carrying the wearable piece 20, the transmitter is activated to send the limit value to the certification unit 200 which responds to write the limit value in the data memory and transmit the limit value to the power tool 10.

Figure 5:
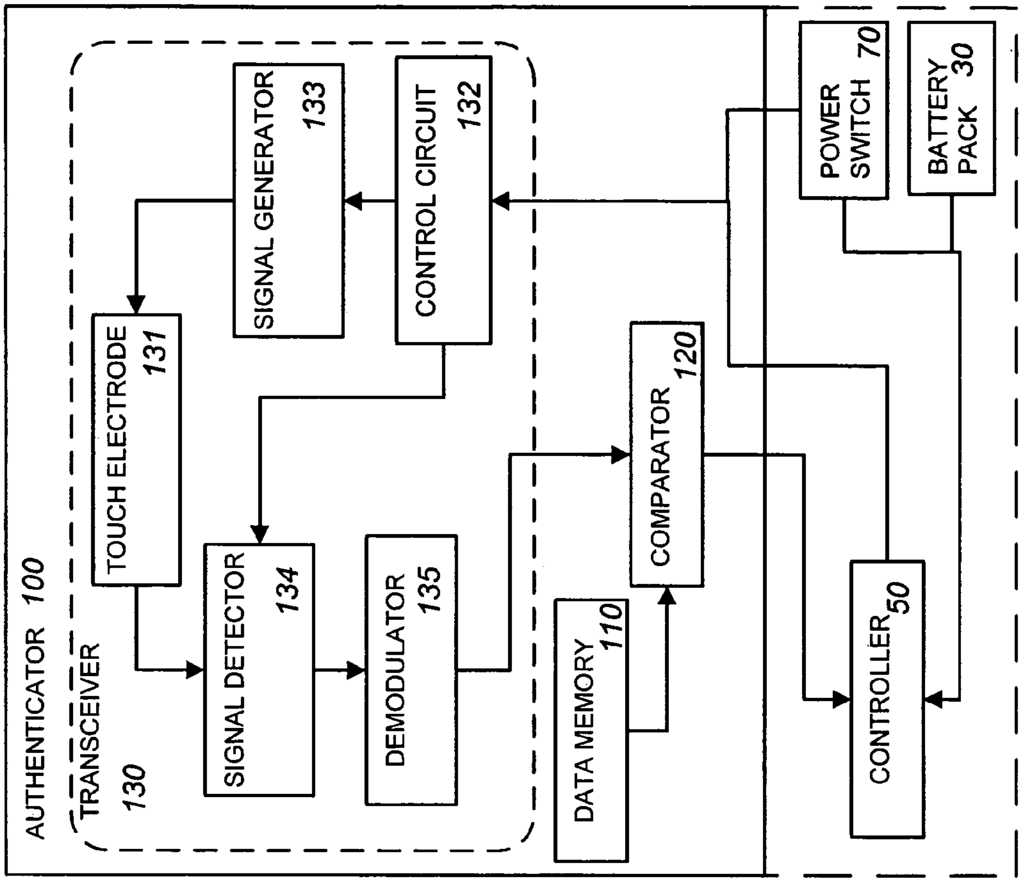
FIGS. 4 and 5 are block diagrams respectively illustrating a certification unit and an authenticator employed in the above system.
Figure 4:
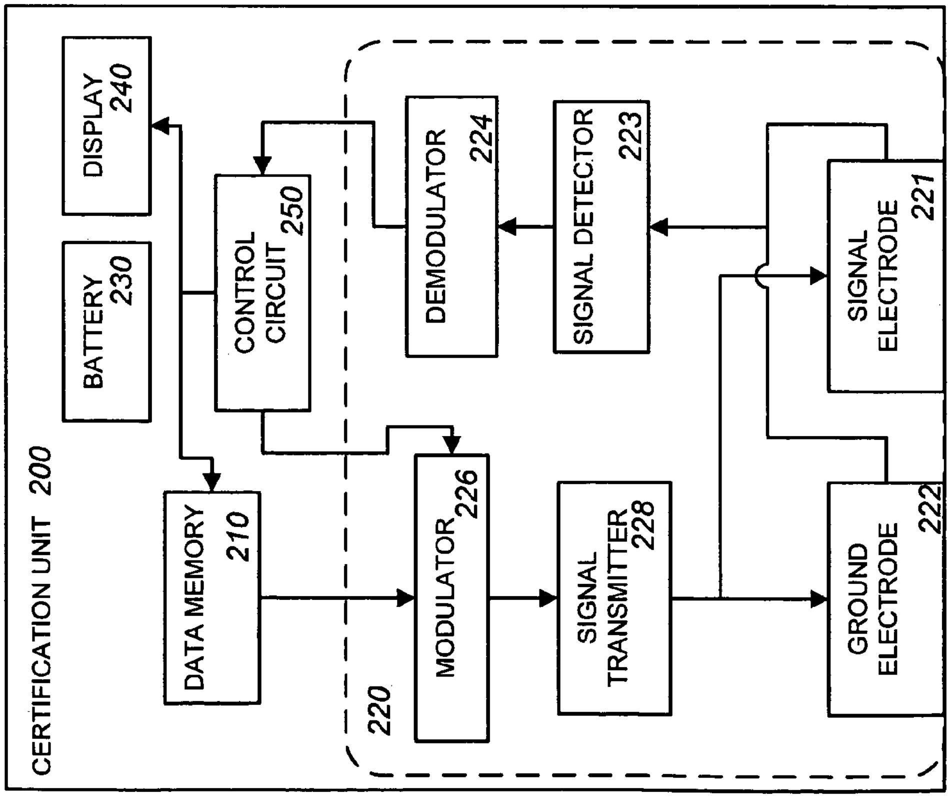

Now referring to FIGS. 4 and 5, the details of the communication between the certification unit 200 of the wearable piece 20 and the authenticator 100 of the power tool 10 is explained. The transceiver 220 of the certification unit 200 has a signal electrode 221 and a ground electrode 222 which are mounted on a surface of the wearable piece 20 such that they are held in close proximity or contact with the user's body in a spaced relation from each other. That is, the electrodes 221 and 222 are placed in series in the signal transmission path which extends from the power tool 10, passes a part of the user's body, and returns back to the power tool 10 through a capacitive coupling between the user and the power tool or a capacitive coupling therebetween via the ground, as shown in FIG. 1. In this connection, the transceiver 130 of the authenticator 100 is configured to have a touch electrode 131 which is exposed on the grip 16 of the power tool 10 for contact with the user's hand. The transceiver 130 has a circuit ground which is realized by an electrically conductive member forming a part of the casing of the power tool 10. Thus, the touch electrode 131, the signal electrode 221 and the ground electrode 222 are connected in series in the signal transmission path, as a consequence of that the user holds the grip 16 of the power tool 10 with the wearable piece 10 carried on. The transceiver 130 of the power tool 10 includes a control circuit 132 which, in response to the triggering of the power switch 70, activates a signal generator 133 to generate an interrogation signal which is applied to the touch electrode 131 and is transmitted to the certification unit 100, requesting to send back the identification code.

On the side of the certification unit 200, the interrogation signal is received across the signal electrode 221 and the ground electrode 222 to be detected at a signal detector 223 followed by being demodulated by a demodulator 224 into a corresponding command. A control circuit 250 in the certification unit 250 responds to instruct a modulator 226 to fetch the identification code or codes from the data memory 210 and modulate into a corresponding voltage signal. The voltage signal is then fed to a signal transmitter 228 and is applied across the signal electrode 221 and the ground electrode 222 to be transmitted to the authenticator 10.

The voltage signal of the identification code is received at the touch electrode 131 of the transceiver 130 in the authenticator 100 to be detected at a signal detector 134 followed by being demodulated into the identification code which is then fed to the comparator 120 for verification thereof in comparison with the identification code stored in the data memory 110.

Figure 2:
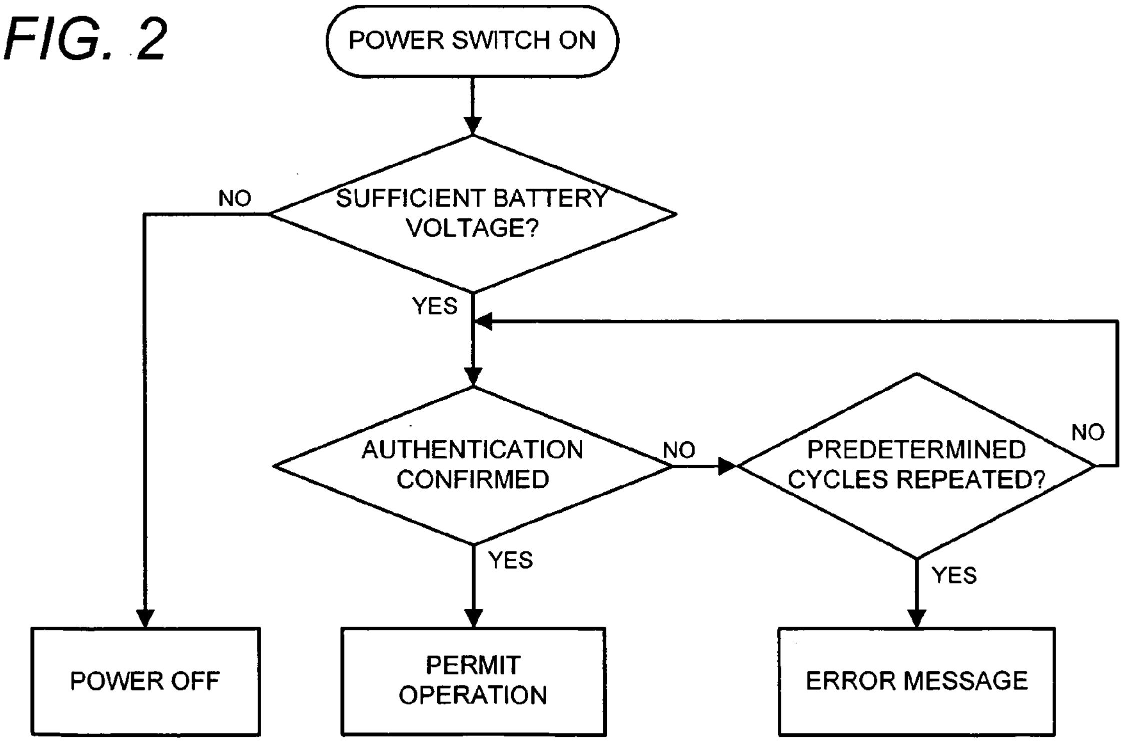
FIG. 2 is a flow chart illustrating an operation of the above system.

The controller 50 of the power tool 10 is configured to make an initialization sequence upon triggering of the power switch, as shown in FIG. 2. First, it is checked whether or not the voltage of the battery pack 30 is sufficient. If not, the controller 50 shuts the power off. If sufficient, the sequence goes to an authentication step where the above authentication is repeated within a short predetermined time. If the authentication signal is generated within the time, the controller 50 enables the power tool to perform the intended operation. If the authentication signal is not confirmed within the time, the controller 50 disables the power tool 10 and generates an error message in the form of a sound, voice or text which is issued from a speaker or displayed on a display on a display included in the power tool. After the initializing sequence is made or the predetermined time is elapsed, the controller 50 responds to stop feeding the power to the authenticator 100 of which transceiver 130 is inherently power consuming, thereby saving the power.

The data memory 210 of the certification unit 200 may be configured to store a maximum limit with regard to a cumulative time of use or a cumulative number of cycles of use allowed to the tool bit or other parts of the power tool such that the controller 50 generates an alarm notifying the necessity of part replacement or maintenance when the maximum limit is acknowledged by the controller 50.

The power tool may be designed to include a direction selector which selects a direction of the motor. The direction selector is movable past a neutral position between a forward position of rotating the motor in the forward direction and a reverse position of rotating the motor in the reverse direction. In this case, the authenticator 100 may be activated in response to the direction selector being out of the neutral position of not rotating the motor.

Figure 7:
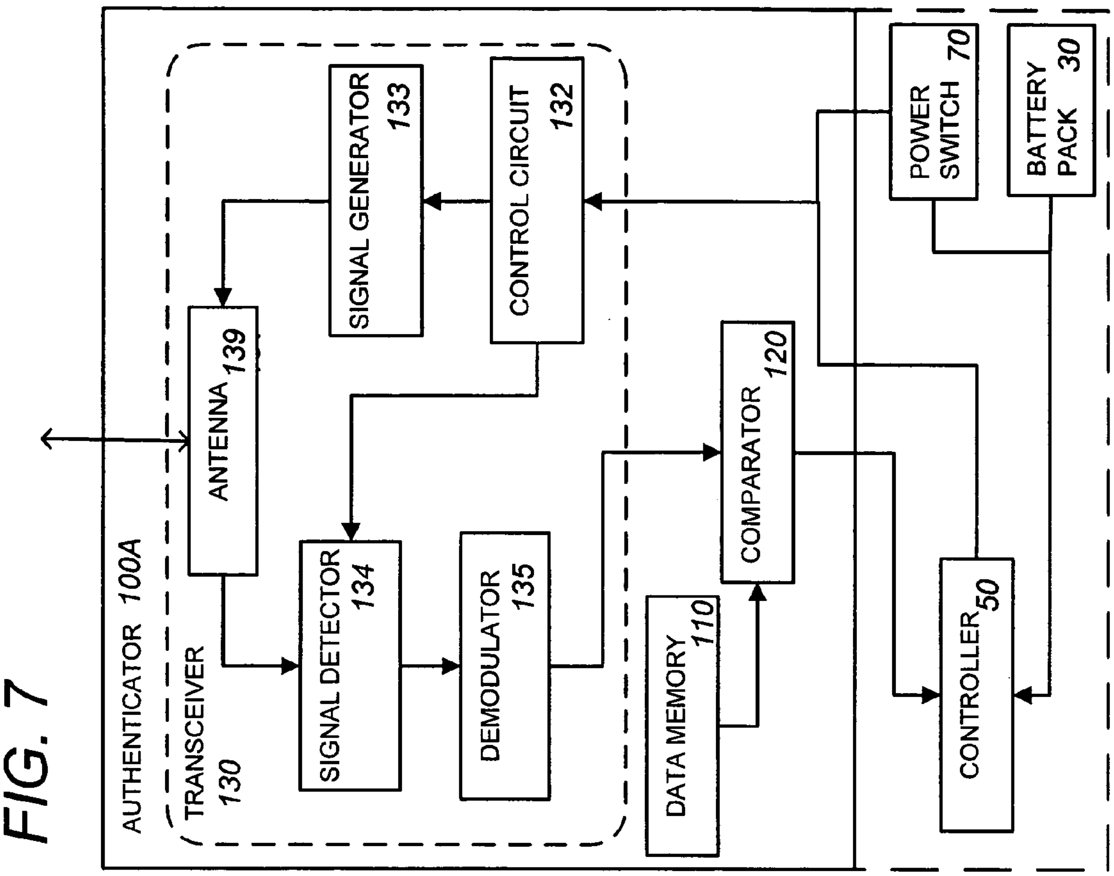
FIGS. 6 and 7 are block diagrams respectively illustrating a certification unit and an authenticator in accordance with a modification of the above embodiment.
Figure 6:
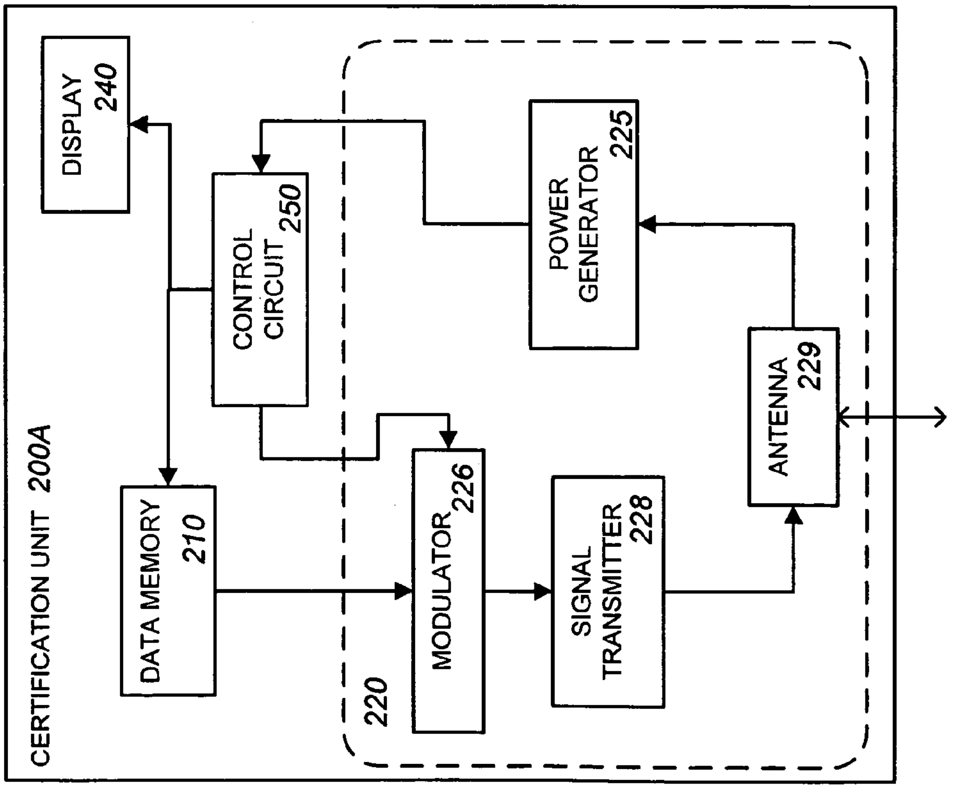

FIGS. 6 and 7 illustrate a modified combination of a certification unit 200A and an authenticator 100A which may be equally employed in the present invention. The modification is identical to the above embodiment except that the power tool 10 establishes the communication with the wearable piece 20 by a radio transmission within a short range. For this purpose, radio frequency identification (RFID) technique is relied upon for making the authentication. The authenticator 200A is of the same configuration as that of the above embodiment except for the use of an antenna 139 instead of the electrode 131. The certification unit 100A is configured to have a like data memory 210, a like control circuit 250, and a transceiver 220 composed of an antenna 229, a signal transmitter 228, and a power generator 225. Like parts are designated by like reference numerals, and therefore no duplicated explanation is deemed necessary. In this radio communication, the authenticator 100A gives off the interrogation signal through the antenna 139. The interrogation signal received at the antenna 229 of the certification unit 200A is sent to the power generator 225 which responds to generate an operating voltage, and activate the control circuit 250 by feeding the voltage. Upon being activated, the control circuit 250 reads from the data memory 210 the identification code, which is modulated and transformed respectively at 226 and 228 into a corresponding ID signal to be transmitted through the antenna 229 to the authenticator 100A. The ID signal received at the antenna 139 is detected at the signal detector 134 and demodulated at 135 to give the identification code. Thus, the signal detector 134 is cooperative with the demodulator 135 to define a reader which reads the identification code carried on the ID signal. The identification code is then analyzed in the same manner as in the previous embodiment for determination of the user carrying the wearable piece 20. The Although the above embodiment and modification illustrate that the power tool 10 incorporates the authenticator 100, while the wearable piece 20 incorporates the certification unit 200, the present invention should not be interpreted thereto and may encompass an arrangement in which the power tool incorporate the certification unit, while the wearable unit incorporates the authenticator. In this instance, the authenticator in the wearable piece is configured to receive the identification code from the certification unit in the power tool, and to send the authentication signal back to the power tool so that the controller in the power tool can enable or disable the operation.

The invention claimed is:

1. A power tool system comprising:

a power tool configured to be manipulated by a user and to include a controller which enables said power tool only upon receiving an authentication signal;

a wearable piece provided as a separate entity from said power tool and configured to be worn by said user;

a certification unit configured to store an identification code specifying said power tool and to transmit said identification code; and an authenticator configured to read said identification code from said certification unit and to provide said authentication signal to said controller when said identification code is authenticated to be eligible for a privileged use of said power tool;

wherein said power tool incorporates one of said authenticator and said certification unit, while said wearable piece incorporates the other of said authenticator and said certification unit;

said system includes communication means which is configured to establish a communication between said certification unit and said authenticator for transmission of said identification code therebetween, while the user holds said power tool with said wearable piece carried on, wherein said communication means is configured to use the user's body as a signal transmission path, and wherein said communication means comprises a first transceiver incorporated in said certification unit, and a second transceiver incorporated in said authenticator; and, said first transceiver including:

a signal electrode configured to be held in close proximity to the user's body;

a ground electrode configured to be held close proximity to the user's body in a spaced relation from said signal electrode; and a transmitter configured to apply a voltage signal indicative of said identification code across said signal electrode and said ground electrode;

said second transceiver including:

a circuit ground configured to be connected to the ground through a casing of said power tool;

a touch electrode provided on a grip of said power tool for contact with the user's hand; and a signal detector configured to be connected across said touch electrode and said circuit ground for detection of said voltage signal.

2. A power tool system comprising:

a power tool configured to be manipulated by a user and to include a controller which enables said power tool only upon receiving an authentication signal;

a wearable piece provided as a separate entity from said power tool and configured to be worn by said user;

a certification unit configured to store an identification code specifying said power tool and to transmit said identification code; and an authenticator configured to read said identification code from said certification unit and to provide said authentication signal to said controller when said identification code is authenticated to be eligible for a privileged use of said power tool;

wherein said power tool incorporates one of said authenticator and said certification unit, while said wearable piece incorporates the other of said authenticator and said certification unit;

said system includes communication means which is configured to establish a communication between said certification unit and said authenticator for transmission of said identification code therebetween, while the user holds said power tool with said wearable piece carried on, wherein said wearable piece (20) incorporates said certification unit (200; 200A), and said power tool (10) incorporates said authenticator (100; 100A), and said authenticator (100; 100A) is configured to interrogate said certification unit to receive said identification code therefrom for authentication of said identification code, said authenticator transmitting said authentication signal to said controller when said identification code is authenticated.

3. The power tool system as set forth in claim 2, wherein said authenticator (100; 100A) configured to be activated upon said power tool being energized.

4. The power tool system as set forth in claim 2, wherein said power tool has a reversible motor and is configured to have a direction selector which is movable past a neutral position of not rotating said motor between a forward position of rotating said motor in a forward direction and a reverse position of rotating said motor, said authenticator being configured to be activated in response to said direction selector being out of said neutral position.

5. The power tool system as set forth in claim 2, wherein said power tool is configured to have a function of varying an output power or an output torque to be applied to a target object; said certification unit is configured to store a limit value of said output power or said output torque; said authenticator passing said limit value from said certification unit to said controller for limiting said output power or said output torque.

6. The power tool system as set forth in claim 5, wherein said certification unit is configured to communicate with a transmitter provided on the side of a target object for which said power tool is used, said certification unit being configured to obtain said limit value specified in a data memory provided on the side of said target object and transmitted through said transmitter.

7. A power tool system comprising:

a power tool configured to be manipulated by a user and to include a controller which enables said power tool only upon receiving an authentication signal;

a wearable piece provided as a separate entity from said power tool and configured to be worn by said user;

a certification unit configured to store an identification code specifying said power tool and to transmit said identification code; and an authenticator configured to read said identification code from said certification unit and to provide said authentication signal to said controller when said identification code is authenticated to be eligible for a privileged use of said power tool;

wherein said power tool incorporates one of said authenticator and said certification unit, while said wearable piece incorporates the other of said authenticator and said certification unit;

said system includes communication means which is configured to establish a communication between said certification unit and said authenticator for transmission of said identification code therebetween, while the user holds said power tool with said wearable piece carried on, wherein said power tool incorporates said certification unit, and said wearable piece incorporates said authenticator, and said authenticator is configured to interrogate said certification unit to receive said identification code therefrom for authentication of said identification code, said authenticator transmitting said authentication signal to said controller when said identification code is authenticated.

8. The power tool system as set forth in claim 7, wherein said authenticator (100; 100A) configured to be activated upon said power tool being energized.

9. The power tool system as set forth in claim 7, wherein said power tool has a reversible motor and is configured to have a direction selector which is movable past a neutral position of not rotating said motor between a forward position of rotating said motor in a forward direction and a reverse position of rotating said motor, said authenticator being configured to be activated in response to said direction selector being out of said neutral position.

10. The power tool system as set forth in claim 7, wherein said power tool is configured to have a detachable battery pack as a power source, said battery pack is configured to have a battery authenticator and an interrupter, said battery authenticator configured to read said identification code from said certification unit and to provide a battery authentication signal when said identification code is authenticated to be eligible for a privileged use of said battery pack; said interrupter configured to interrupt an electrical connection from said battery pack to said power tool in the absence of said battery authentication signal.

11. A power tool system comprising:

a power tool configured to be manipulated by a user and to include a controller which enables said power tool only upon receiving an authentication signal;

a wearable piece provided as a separate entity from said power tool and configured to be worn by said user;

a certification unit configured to store an identification code specifying said power tool and to transmit said identification code; and an authenticator configured to read said identification code from said certification unit and to provide said authentication signal to said controller when said identification code is authenticated to be eligible for a privileged use of said power tool;

wherein said power tool incorporates one of said authenticator and said certification unit, while said wearable piece incorporates the other of said authenticator and said certification unit; said system includes communication means which is configured to establish a communication between said certification unit and said authenticator for transmission of said identification code therebetween, while the user holds said power tool with said wearable piece carried on;

wherein said power tool is configured to have a detachable battery pack as a power source, said battery pack is configured to have a battery authenticator and an interrupter, said battery authenticator configured to read said identification code from said certification unit and to provide a battery authentication signal when said identification code is authenticated to be eligible for a privileged use of said battery pack; said interrupter configured to interrupt an electrical connection from said battery pack to said power tool in the absence of said battery authentication signal.

* * * * *